United States Patent
Pulkrabek

(10) Patent No.: US 11,985,962 B2
(45) Date of Patent: May 21, 2024

(54) FISHING REEL AXIAL FORCE DISTRIBUTION

(71) Applicant: TrikaUSA Inc., Superior, WI (US)

(72) Inventor: Larry Pulkrabek, Superior, WI (US)

(73) Assignee: TrikaUSA Inc., Superior, WI (US)

( * ) Notice: Subject to any disclaimer, the term of this patent is extended or adjusted under 35 U.S.C. 154(b) by 0 days.

(21) Appl. No.: 17/903,951

(22) Filed: Sep. 6, 2022

(65) Prior Publication Data

US 2023/0071449 A1     Mar. 9, 2023

Related U.S. Application Data

(60) Provisional application No. 63/241,397, filed on Sep. 7, 2021.

(51) Int. Cl.
*A01K 89/01* (2006.01)
*A01K 89/015* (2006.01)
*A01K 89/033* (2006.01)

(52) U.S. Cl.
CPC ........ *A01K 89/033* (2013.01); *A01K 89/0183* (2015.05)

(58) Field of Classification Search
CPC ............ A01K 89/0183; A01K 89/0186; A01K 89/0189; A01K 89/01903; A01K 89/01905; A01K 89/01906; A01K 89/0193; A01K 89/01931; A01K 89/045; A01K 89/058; A01K 89/059
See application file for complete search history.

(56) References Cited

U.S. PATENT DOCUMENTS

| | | | | |
|---|---|---|---|---|
| 2010/0006687 A1* | 1/2010 | Ikuta | .................... | A01K 89/033 242/243 |
| 2010/0006688 A1* | 1/2010 | Ikuta | .................. | A01K 89/0192 242/297 |
| 2011/0079672 A1* | 4/2011 | Kim | .................. | A01K 89/01557 242/289 |
| 2015/0201599 A1* | 7/2015 | Yin | ........................ | A01K 89/05 242/256 |

* cited by examiner

*Primary Examiner* — Emmanuel M Marcelo
(74) *Attorney, Agent, or Firm* — Foley & Lardner LLP

(57) ABSTRACT

A baitcaster includes a housing, a spool, a drivetrain, a bearing housing, and an input shaft. The housing defines a first member and a second member. The spool is positioned between the first member and the second member. The spool is configured to rotate in a first direction and a second direction. The drivetrain is positioned proximate the first member and is configured to rotate the spool in the first direction and the second direction. The bearing housing is positioned between the spool and the drivetrain. The input shaft is disposed along at least a midpoint of the baitcaster. The input shaft is configured to coaxially align the spool, drivetrain, and bearing housing. An axial force is generated between the spool and the drivetrain. The axial force is distributed through at least a portion of the bearing housing to prohibit the axial force from transferring into the drivetrain.

17 Claims, 4 Drawing Sheets

FISHING REEL AXIAL FORCE DISTRIBUTION

CROSS-REFERENCE TO RELATED PATENT APPLICATION

This application claims the benefit of and priority to U.S. Provisional Patent Application No. 63/241,397, filed Sep. 7, 2021, the disclosure of which is incorporated herein by reference in its entirety.

BACKGROUND

The present disclosure relates generally to fishing reels. More particularly, the present disclosure relates to force distribution on fishing reels.

Fishing reels have historically used axial force between the spool and the driving mechanism to act as a clutch, also known as "drag." When torsional forces on the spool override the friction between the spool and the driving mechanism, the spool is able to spin. This is necessary so that fishing lines, gear, rods, etc. do not get pushed to a point of failure.

A linear relationship exists between the axial force and the drag force. Thus, a larger axial force between the spool and the driving mechanism proportionally results in a larger amount of torsional force it takes to turn the spool. The issue with this is that on all current reels, the axial force is translated directly into the drivetrain putting unnecessary stress on all of its components.

SUMMARY

At least one embodiment of the present disclosure relates to a baitcaster for retrieving a fishing line. The baitcaster includes a housing, a spool, a drivetrain, a bearing housing, and an input shaft. The housing defines a first member and a second member. The spool is positioned between the first member and the second member. The spool is configured to rotate in a first direction and a second direction. The drivetrain is positioned proximate the first member and is configured to rotate the spool in the first direction and the second direction. The bearing housing is positioned between the spool and the drivetrain. The input shaft is disposed along at least a midpoint of the baitcaster. The input shaft is configured to coaxially align the spool, drivetrain, and bearing housing. An axial force is generated between the spool and the drivetrain. The axial force is distributed through at least a portion of the baitcaster. The axial force is distributed through at least a portion of the bearing housing to prohibit the axial force from transferring into the drivetrain.

Another embodiment of the present disclosure relates to a baitcaster for retrieving a fishing line. The baitcaster includes a housing, a spool drive mechanism, a bearing housing, and a braking mechanism. The housing defines a first member and a second member. The spool drive mechanism is coupled to the first member and configured to rotate a spool in a first direction and a second direction. The bearing housing is positioned between the spool and the spool drive mechanism. The braking mechanism is positioned between the spool and the bearing housing. The braking mechanism is configured to prevent rotation of the spool by applying a force onto the spool via a friction disc. The force applied to the spool from the braking mechanism is a friction force. An axial force is generated between the spool and the spool drive mechanism. The axial force is linearly proportional to the friction force thereby reducing harshness on the baitcaster.

Another embodiment of the present disclosure relates to a fishing rod assembly. The fishing rod assembly includes a rod and a baitcaster fixedly coupled to the rod. The baitcaster includes a housing, a spool drive mechanism, a braking mechanism, an input shaft, and a plurality of bearings. The spool drive mechanism is configured to rotate a spool in a first direction and a second direction. The braking mechanism is positioned proximate the spool. The braking mechanism is configured to generate a friction force to prevent rotation of the spool where the friction force is a force applied onto the spool drive through a friction disc. The input shaft is disposed through at least a portion of the length of the baitcaster. The braking mechanism, bearing housing, spool drive mechanism, and spool are coaxially aligned along the input shaft. The plurality of bearings are configured to facilitate rotation of the input shaft. The plurality of bearings are coaxially aligned along the input shaft and having respective inner portions and outer portions. An axial force generated from rotation of the input shaft via the spool drive mechanism is distributed through at least one of the plurality of bearings to prohibit the axial force from transferring into the spool drive mechanism.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
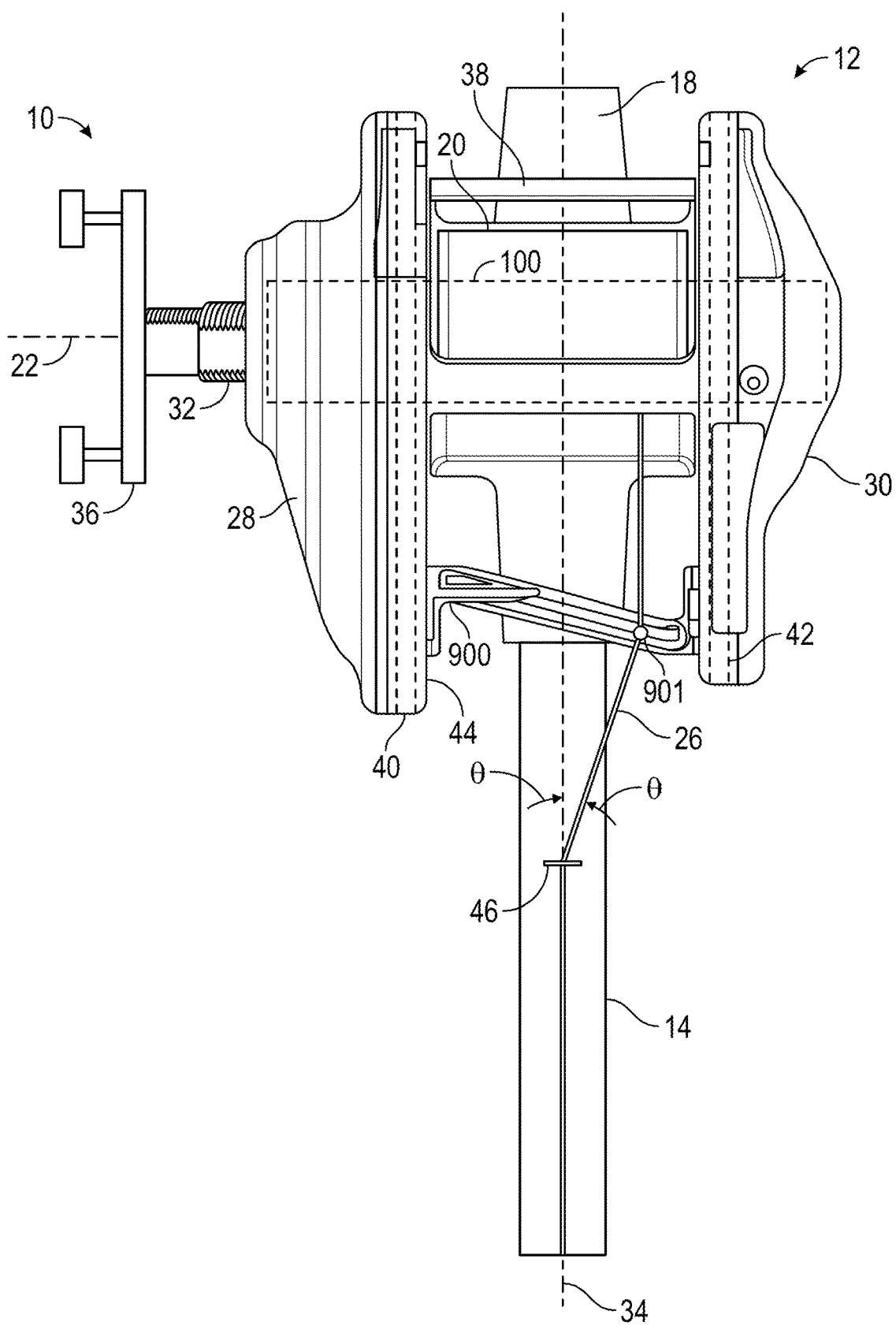
FIG. 1 is a top view of a baitcaster, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a fishing reel includes an elongated member or a fishing rod and a baitcaster apparatus. The baitcaster apparatus is fixedly coupled with the fishing rod and is configured to receive a torque input from a user to retrieve or take-up fishing line that extends along the fishing rod. The fishing line may extend through one or more eyelets that are positioned along the fishing rod and guide the fishing line towards the baitcaster apparatus for winding or take-up onto the spool.

The baitcaster apparatus may include body members and structural members. The body members may be spaced apart and cooperatively define an inner volume in which a spool drive mechanism is disposed. The spool drive mechanism may be configured to receive an input torque from the user through a handle.

The baitcaster apparatus further includes a braking mechanism that is positioned between the spool and the spool drive mechanism. The braking mechanism is configured to apply a force onto the spool, in a direction parallel the input shaft, to prevent rotation of the spool in one of a first direction and a second direction. The braking mechanism is coupled to at least one of a friction disc, where the friction disc is positioned proximate the perimeter of the braking mechanism. The friction disc may generate a friction force between the braking mechanism and the spool.

Positioned between the braking mechanism and the spool drive mechanism is a bearing housing. The bearing housing can hold at least one of a bearing within. Further, the bearing housing may abut the baitcaster proximate a first member.

Coaxially aligned on the input shaft is a plurality of bearings. The plurality of bearings are positioned at varying locations on the input shaft, and may be configured to provide at least one of (a) structural support to the input shaft 32, (b) rotational support to the input shaft, and (c) force distribution throughout the baitcaster apparatus.

The interaction between the spool and the spool drive mechanism generates an axial force, where the axial force creates additional stress onto the system. The axial force may be directed across the baitcaster apparatus, from an end proximate a second member to an end proximate the first member. The axial force may be further configured to be directed through one of the plurality of bearings and into the bearing housing, where the axial force is directed from an inside of one of the bearings to an outside of one of the bearings. From the plurality of bearings, the axial force is directed through the bearing housing and into the first member, where the axial force may avoid the spool drive mechanism. Directing the axial force away from the spool drive mechanism eliminates unnecessary stress onto the spool drive mechanism, therefor decreasing the potential for a failure in the field.

Baitcaster

Figure 2:
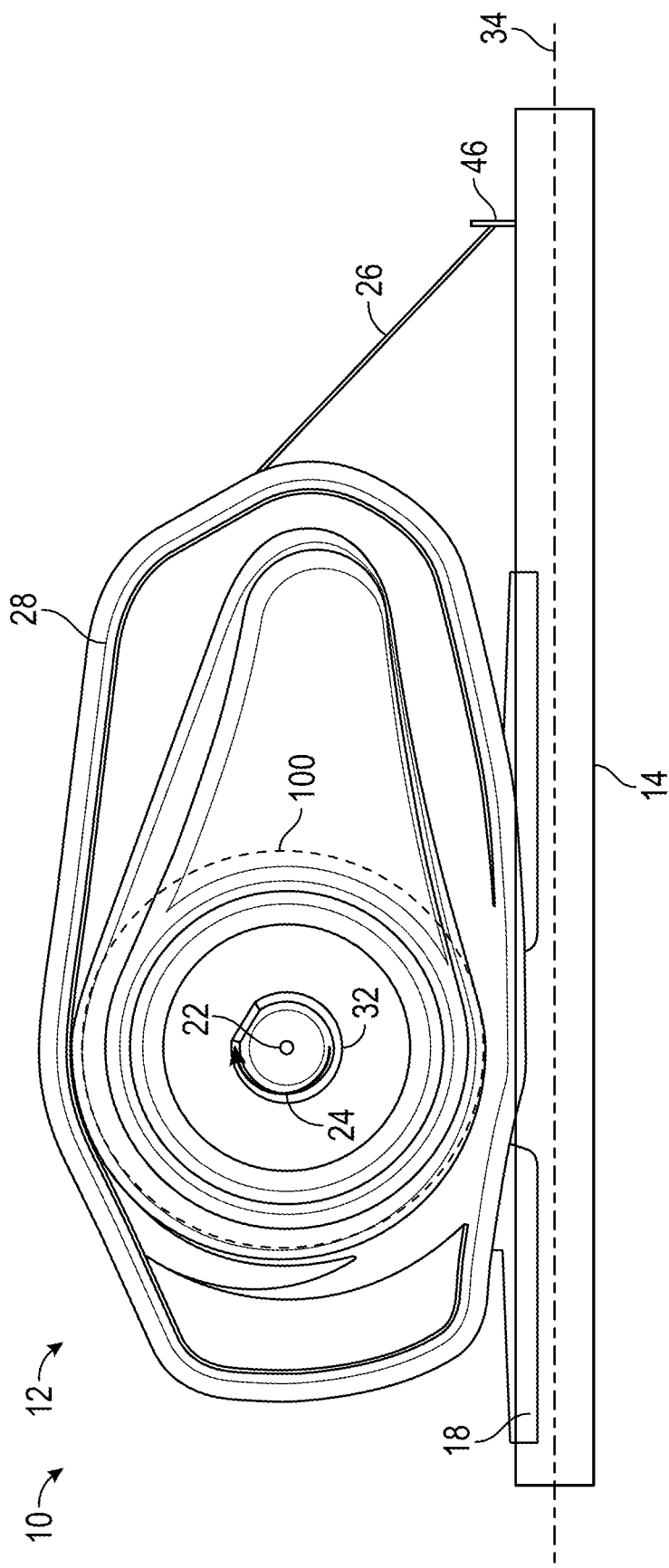
FIG. 2 is a side view of the baitcaster of FIG. 1, according to an exemplary embodiment.

Referring particularly to FIGS. 1 and 2, a fishing reel, a baitcasting reel, a baitcaster, etc., shown as fishing reel 10 includes a rod, a pole, an elongated member, a flexible member, etc., shown as rod 14 and a reel apparatus, a reel mechanism, a reel assembly, a fishing line retrieval apparatus, etc., shown as reel 12. Reel 12 is fixedly coupled, attached, mounted, etc., with rod 14. In some embodiments, reel 12 is fixedly coupled with rod 14 through mounts, attachment members, etc., shown as mount 18. Mount 18 may extend from a bottom portion of reel 12 and fixedly couple with rod 14.

Reel 12 includes a spool, a barrel, a cylindrical member, etc., shown as spool 20. Spool 20 may be rotatably coupled with an input shaft, a rotatable shaft, a shaft, a first shaft, etc., shown as input shaft 32 such that spool 20 rotates when input shaft 32 is turned. In some embodiments, input shaft 32 is rotatably or fixedly coupled with a handle 36. An axis 22 extends through input shaft 32 and spool 20. Input shaft 32 and spool 20 can be co-axial with each other about axis 22. Handle 36 facilitates an input torque to input shaft 32 about axis 22 for driving spool 20. In some embodiments, handle 36 and input shaft 32 are configured to rotate in a first direction (e.g., direction 24) to take-up fishing line 26 so that fishing line 26 is wound onto spool 20.

Fishing line 26 can extend along rod 14 and may be guided by one or more eyelets 46. Eyelets 46 can be positioned along rod 14 and can include an opening, a hole, an aperture, etc., through which fishing line 26 passes. Fishing line 26 may extend from an eyelet 46 that is most proximate reel 12 onto spool 20. Rod 14 defines a central axis 34 that extends longitudinally through a center of rod 14. Fishing line 26 may be guided from eyelet 46 that is most proximate reel 12 to spool 20. Fishing line 26 that is between the eyelet 46 most proximate reel 12 and central axis 34 may define an angle $\theta$. The angle $\theta$ may change from a maximum positive value $\theta_{+,max}$ to a maximum negative value $\theta_{-,max}$ as fishing line 26 is taken up or reeled onto spool 20.

Reel 12 includes a first or a handle-side body member, housing member, structural member, etc., shown as first body member 28, and a second body member, housing member, structural member, etc., shown as second body member 30. First body member 28 and second body member 30 can define opposite sides of reel 12. Spool 20 can be positioned between first body member 28 and second body member 30 and may extend between first body member 28 and second body member 30. Spool 20 can be supported or rotatably coupled on either end with first body member 28 and second body member 30. Spool 20 may rotate relative to first body member 28 and second body member 30.

Reel 12 includes a guide member 900 that is configured to extend between first body member 28 and second body member 30 and be driven to rotate by rotation of handle 36. In some embodiments, guide member 900 is configured to engage fishing line 26 at a contact point 901. Fishing line 26 may be guided onto spool 20 from contact point 901. For example, fishing line 26 may extend from contact point 901 onto spool 20 where it is then wound onto spool 20. Rotation of guide member 900 can result in reciprocative translation of contact point 901. For example, as guide member 900 rotates, contact point 901 may shift back and forth along guide member 900 between opposite ends of guide member 900. In this way, fishing line 26 is guided and wound onto spool 20 along an entire longitudinal length of spool 20, thereby facilitating an even distribution of fishing line 26 on spool 20 and reducing knotting and/or bunching of fishing line 26 on spool 20 (e.g., an uneven distribution of fishing line 26). Evenly distributing and winding fishing line 26 on spool 20 can reduce a likelihood of fishing line 26 snagging, knotting, or becoming tangled when fishing line 26 is let out (e.g., released) from spool 20 (e.g., for casting operations).

Referring still to FIGS. 1 and 2, input shaft 32 extends through first body member 28 and protrudes outwards from first body member 28. Handle 36 is coupled with input shaft 32 exterior of first body member 28 so that handle 36 can be operated by a fisherman's right hand while rod 14 is held by the fisherman's left hand. In other embodiments, input shaft 32 extends outwards through second body member 30 so that handle 36 is operated by the fisherman's left hand while rod 14 is held by the fisherman's right hand.

Input shaft 32 is configured to turn and drive rotation of spool 20 through a spool drive mechanism, a compound planetary gear assembly, a gear train, a gear assembly, etc., shown as spool drive mechanism 100. Spool drive mechanism 100 can be configured to receive torque from input shaft 32 and transfer the torque to spool 20 so that spool 20 rotates to take up or wind fishing line 26 onto spool 20.

Referring particularly to FIG. 1, reel 12 includes an input member, a bar, a rotatable linkage, a translatable member, a lever, a button, etc., shown as lever 38. Lever 38 may extend between first body member 28 and second body member 30 and may be pivotable, rotatable, and/or translatable between a first position and a second position. In some embodiments, lever 38 is configured to be transitioned between the first position and the second position to selectively couple input shaft 32 with spool 20.

Referring still to FIG. 1, reel 12 can include a first structural member, a first frame member, etc., shown as first frame member 40, and a second structural member, a second frame member, etc., shown as second frame member 42. First frame member 40 and second frame member 42 can be parallel with each other and may both extend in a longitudinal direction that is defined by central axis 34. First frame member 40 and second frame member 42 may be positioned within first body member 28 and second body member 30, respectively or may be positioned within an inner volume that is at least partially defined by first body member 28 and second body member 30.

Referring still to FIG. 1, reel 12 can include a central body member, a central housing, etc., shown as body member 44. In some embodiments, body member 44 extends between first body member 28 and second body member 30. First body member 28 and body member 44 may cooperatively define a first inner volume in which first structural member 40 is positioned. Second body member 30 and body member 44 may cooperatively define a second inner volume in which second frame member 42 is positioned.

Figure 3:
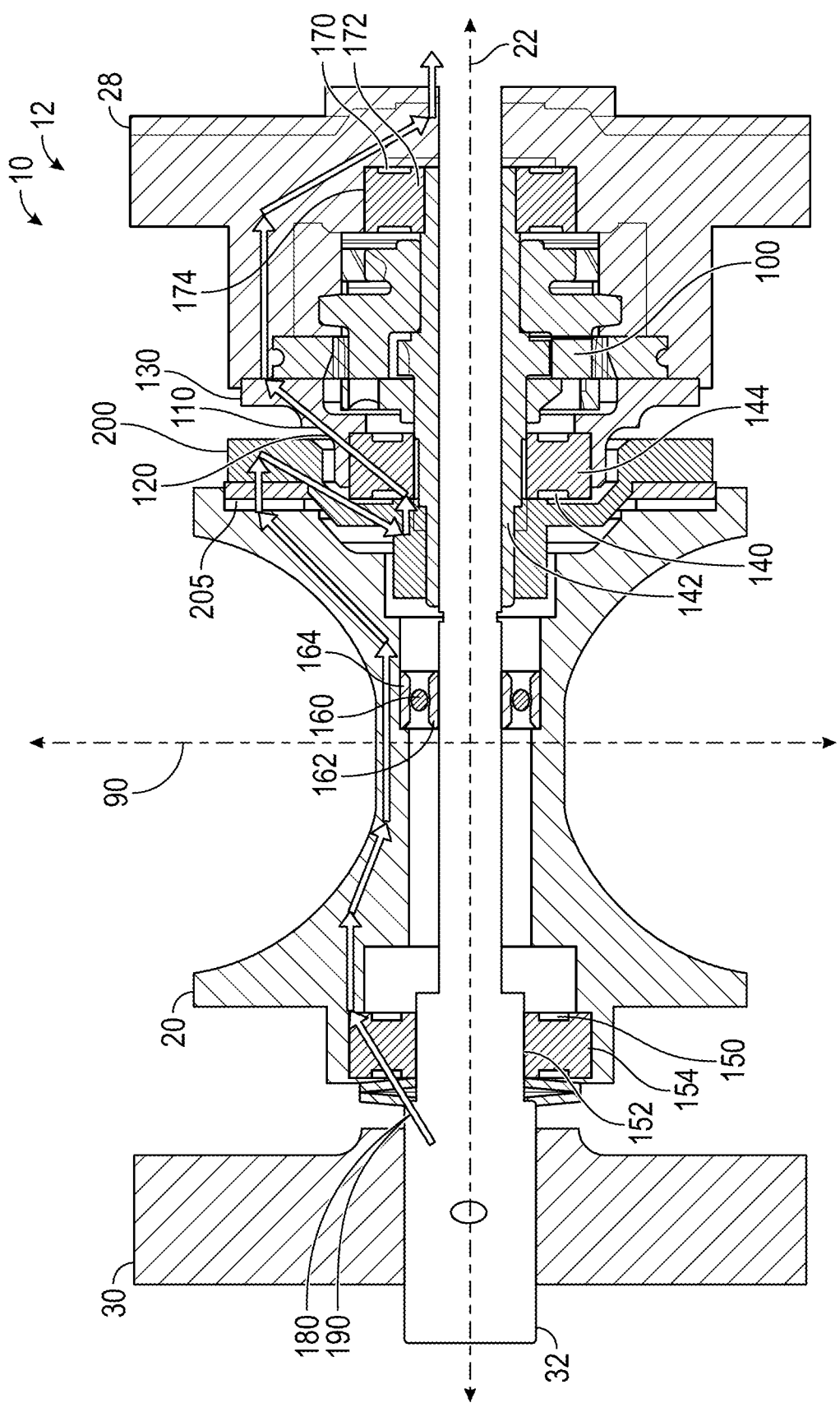
FIG. 3 is a sectional view of the baitcaster of FIG. 1 including a bearing housing, according to an exemplary embodiment.

Referring particularly to FIG. 3, the reel 12 includes a number of components positioned between one of the first body member 28 and the second body member 30. The reel 12 may include an axis, shown as lateral axis 90. The lateral axis 90 may be positioned at the midpoint of the spool 20, perpendicular to the axis 22. In some embodiments, the lateral axis 90 may be positioned at the midpoint of the reel 12. In still some embodiments, the lateral axis 90 may be positioned at any location along the reel 12, perpendicular to the axis 22. The reel 12 may include a spool drive mechanism, drivetrain, etc., shown as spool drive mechanism 100. The spool drive mechanism 100 may be a planetary gear set, a planetary gear train, a compound planetary gear set, compound gear set, or the like. The spool drive mechanism 100 may be configured to drive rotation of the spool 20, where rotation of the input shaft 32 may drive the planetary gear set disposed within the spool drive mechanism 100.

The reel 12 may further include a braking mechanism, brake system, stopping mechanism, or brake plate, shown as braking mechanism 200. The braking mechanism 200 may be positioned between the spool drive mechanism 100 and the spool 20. The braking mechanism 200 may be coaxially aligned with the spool drive mechanism 100, such that the input shaft 32 is disposed between a midpoint of both the braking mechanism 200 and the spool drive mechanism 100. The braking mechanism 200 may be coupled to the spool 20, where the braking mechanism 200 may be configured to slow the spool 20 upon rotation. To be more precise, the braking mechanism 200 may be coupled to a friction plate, friction disc, or rotor, shown as friction disc 205, where the friction disc 205 may abut the spool 20. The friction disc 205 may be positioned between the spool 20 and the braking mechanism 200, proximate the perimeter of the braking mechanism 200. In some embodiments, friction disc 205 may be coupled to braking mechanism 200, distal the perimeter of the braking mechanism 200. The friction disc 205 may be configured to abut the spool 20 and apply a constant friction force onto the spool 20 to slow down rotation of the spool 20. In some embodiments, the friction disc 205 may apply an inconsistent (e.g., pulsing, actuating, etc.) friction force onto the spool 20. The braking mechanism 200 may be configured to bias the friction disc 205 towards the spool 20 such to apply the friction force onto the spool 20. In some embodiments, the reel 12 may include a drag (e.g., star drag, etc.) that is configured to bias the friction disc 205 proximate the spool 20.

Referring still to FIG. 3, positioned between the braking mechanism 200 and the spool drive mechanism 100, is a housing, shown as bearing housing 110. The bearing housing 110 may be selectively coupled to the spool drive mechanism 100. The bearing housing 110 may be positioned proximate the first body member 28. In some embodiments, the bearing housing 110 and the first body member 28 may be a single component. In still some embodiments, the bearing housing 110 may be positioned distal the spool drive mechanism 100, opposite the spool 20. The bearing housing 110 may further be coaxially aligned with the spool drive mechanism 100 along the axis 22, where the input shaft 32 may be disposed through a midpoint of at least the spool drive mechanism 100 and the bearing housing 110. The bearing housing 110 further includes a first portion 120 and a second portion 130. The first portion 120 may be an inner portion of the bearing housing 110 positioned proximate the input shaft 32 and the second portion 130 may be an outer portion of the bearing housing 110 positioned distal the input shaft 32. In some embodiments, the first portion 120 may be an outer portion of the bearing housing 110 and the second portion 130 may be an inner portion of the bearing housing 110. In still some embodiments, the first portion 120 may be positioned distal the input shaft 32 and the second portion 130 may be positioned proximate the input shaft 32. The first portion 120 may be configured to receive within a portion of the braking mechanism 200, such that the bearing housing 110 and the braking mechanism 200 may be selectively coupled.

Positioned within the first portion 120, proximate the input shaft 32, is a bearing, shown as first bearing 140. First bearing 140 may abut at least one of the bearing housing 110 and the braking mechanism 200. In some embodiments, the first bearing 140 may further abut the spool drive mechanism 100. The first bearing 140 includes an inner portion and an outer portion, shown as first bearing inner portion 142 and first bearing outer portion 144. The first bearing inner portion 142 and the first bearing outer portion 144 may be positioned such to at least partially surround a first set of bearing balls. In some embodiments, the first bearing inner portion 142 and the first bearing outer portion 144 may completely enclose the first set of bearing balls. According to an exemplary embodiment, the first bearing inner portion 142 may be an inner bearing race, and the first bearing outer portion may be an outer bearing race. In such an exemplary embodiment, one of the first bearing inner portion 142 and the first bearing outer portion 144 may be configured to rotate about the input shaft 32. In some embodiments, both the first bearing inner portion 142 and the first bearing outer portion 144 may be configured to rotate about the input shaft 32.

Positioned between the second body member 30 and the spool 20, and abutting the spool 20, is a bearing, shown as second bearing 150. Second bearing 150 may abut at least one of the spool 20 and the input shaft 32. The second bearing 150 includes an inner portion and an outer portion, shown as second bearing inner portion 152 and second bearing outer portion 154. The second bearing inner portion 152 and the second bearing outer portion 154 may be positioned such to at least partially surround a second set of bearing balls. In some embodiments, the second bearing inner portion 152 and the second bearing outer portion 154 may completely enclose the second set of bearing balls.

According to an exemplary embodiment, the second bearing inner portion 152 may be an inner bearing race, and the second bearing outer portion 154 may be an outer bearing race. In such an exemplary embodiment, one of the second bearing inner portion 152 and the second bearing outer portion 154 may be configured to rotate about the input shaft 32. In some embodiments, both the second bearing inner portion 152 and the second bearing outer portion 154 may be configured to rotate about the input shaft 32.

Positioned between the first bearing 140 and the second bearing 150 is a bearing, shown as third bearing 160. The third bearing 160 may further be positioned between the spool 20 and the input shaft 32, such to couple the spool 20 to the input shaft 32. Third bearing 160 includes an inner portion and an outer portion, shown as third bearing inner portion 162 and third bearing outer portion 164. The third bearing inner portion 162 and the third bearing outer portion 164 may be positioned such to at least partially surround a third set of bearing balls. According to an exemplary embodiment, the third bearing inner portion 162 may be an inner bearing race, and the third bearing outer portion 164 may be an outer bearing race. In such an exemplary embodiment, one of the third bearing inner portion 162 and the third bearing outer portion 164 may be configured to rotate about the input shaft 32. In some embodiments, both the third bearing inner portion 162 and the third bearing outer portion 164 may be configured to rotate about the input shaft 32.

Coupled to the spool drive mechanism 100, proximate the first body member 28, is a bearing, shown as fourth bearing 170. The fourth bearing 170 may further abut the first body member 28. Fourth bearing 170 may include an inner portion and an outer portion, shown as fourth bearing inner portion 172 and the fourth bearing outer portion 174. The fourth bearing inner portion 172 may be positioned such to at least partially surround a fourth set of bearing balls. According to an exemplary embodiment, the fourth bearing inner portion 172 may be an inner bearing race, and the fourth bearing outer portion 174 may be an outer bearing race. In such an exemplary embodiment, one of the fourth bearing inner portion 172 and the fourth bearing outer portion 174 may be configured to rotate about the input shaft 32. In some embodiments, both the fourth bearing inner portion 172 and the fourth bearing outer portion 174 may be configured to rotate about the input shaft 32.

Referring still to FIG. 3, the bearings 140, 150, 160, 170 may be coaxially aligned along the input shaft 32. In some embodiments, at least one of the bearings 140, 150, 160, 170 may be coaxially aligned along the input shaft 32. The bearings 140, 150, 160, 170 may be configured to facilitate at least one of (a) input shaft 32 support, (b) reduced friction on the internal reel components (e.g., input shaft 32, spool 20, etc.), and (c) axial force distribution.

Axial Force Distribution

Referring generally to FIGS. 1-3, an axial force 180 is translated between the spool 20 and the spool drive mechanism 100. The axial force 180 may be a force that acts in replacement of a clutch for the reel 12. According to an exemplary embodiment, the axial force 180 may be produced when fishing line 26 is pulled from the spool 20, without turning the handle 36 (e.g., drag, etc.). In order to turn the handle 36, a torsional force may be greater than at least one of the axial force 180 and a friction force, where the friction force is the force produced between the friction disc 205 and the spool 20. The relationship between the axial force 180 and at least one of the torsional force and the friction force is necessary to reduce the harshness on the components of the fishing reel 10 (e.g., fishing line 26, spool drive mechanism 100, rod 14, etc.), thus decreasing failure in the field.

The friction force may be the force required to rotate the spool 20, where the force only acts on the fishing reel 10 when fishing line 26 is being unwound from the spool 20. The friction force may be a drag force. By way of example, the friction force is present when fishing line 26 is being unwound by a user, material, fish, or the like. According to an exemplary embodiment, the friction force may be controlled by one of a star drag, wheel, or rotatable member, where the user may rotate the star drag, wheel, or rotatable to increase or decrease the amount of friction on the spool 20 from the friction disc 205.

The axial force may be proportional to the friction force, where increasing the friction force increases the axial force. To be more precise, the larger the amount of torsional force needed to rotate the spool 20 proportionally results in a larger axial force between the spool 20 and the spool drive mechanism 100.

Referring now specifically to FIG. 3, the fishing reel 12 includes a loading direction, axial force direction, or impact direction, shown as axial force direction 190. The axial force direction 190 may be disposed through at least a portion of the reel 12. The axial force direction 190 may extend substantially perpendicular to the input shaft 32. As shown in FIG. 3, the axial force direction 190 routes from the input shaft 32, proximate the second body member 30, to the input shaft 32, proximate the first body member 28. In some embodiments, the axial force direction 190 routes from the input shaft 32, proximate the first body member 28, to the input shaft 32, proximate the second body member 30.

When the friction force acts on the fishing reel 10, the axial force 180 may begin at the input shaft 32, proximate the second body member 30. The axial force 180 may be directed through the input shaft 32 to the second bearing 150. To be more precise, the axial force 180 may be directed through the second bearing inner portion 152 and out of the second bearing outer portion 154. From the second bearing 150, the axial force 180 may be directed through at least a portion of the length of the spool 20. In some embodiments, the axial force 180 may be directed through the entire length of the spool 20. From the spool 20, the axial force 180 may be directed into the friction disc 205. The axial force 180 may travel into the friction disc 205 proximate the spool 20 and out of the friction disc 205 distal the friction disc 205. From the friction disc 205, the axial force 180 may be directed into the braking mechanism 200. To be more precise, the axial force 180 may directed into the braking mechanism 200, distal the input shaft 32. In some embodiments, the axial force 180 may be directed into the braking mechanism 200 proximate the input shaft 32. From the braking mechanism 200, the axial force 180 may be directed into the first bearing 140. To be more precise, the axial force 180 may be directed through the first bearing inner portion 142 and out of the first bearing outer portion 144. From the first bearing 140, the axial force 180 may be directed into the bearing housing 110. To be more precise, the axial force 180 may be directed into the bearing housing 110 proximate the first portion 120, where the axial force 180 is directed out of the bearing housing 110 proximate the second portion 130. From the bearing housing 110, the axial force 180 may be directed into the first body member 28, where the axial force 180 may be directed out of the first body member 28 proximate the input shaft 32.

Figure 4:
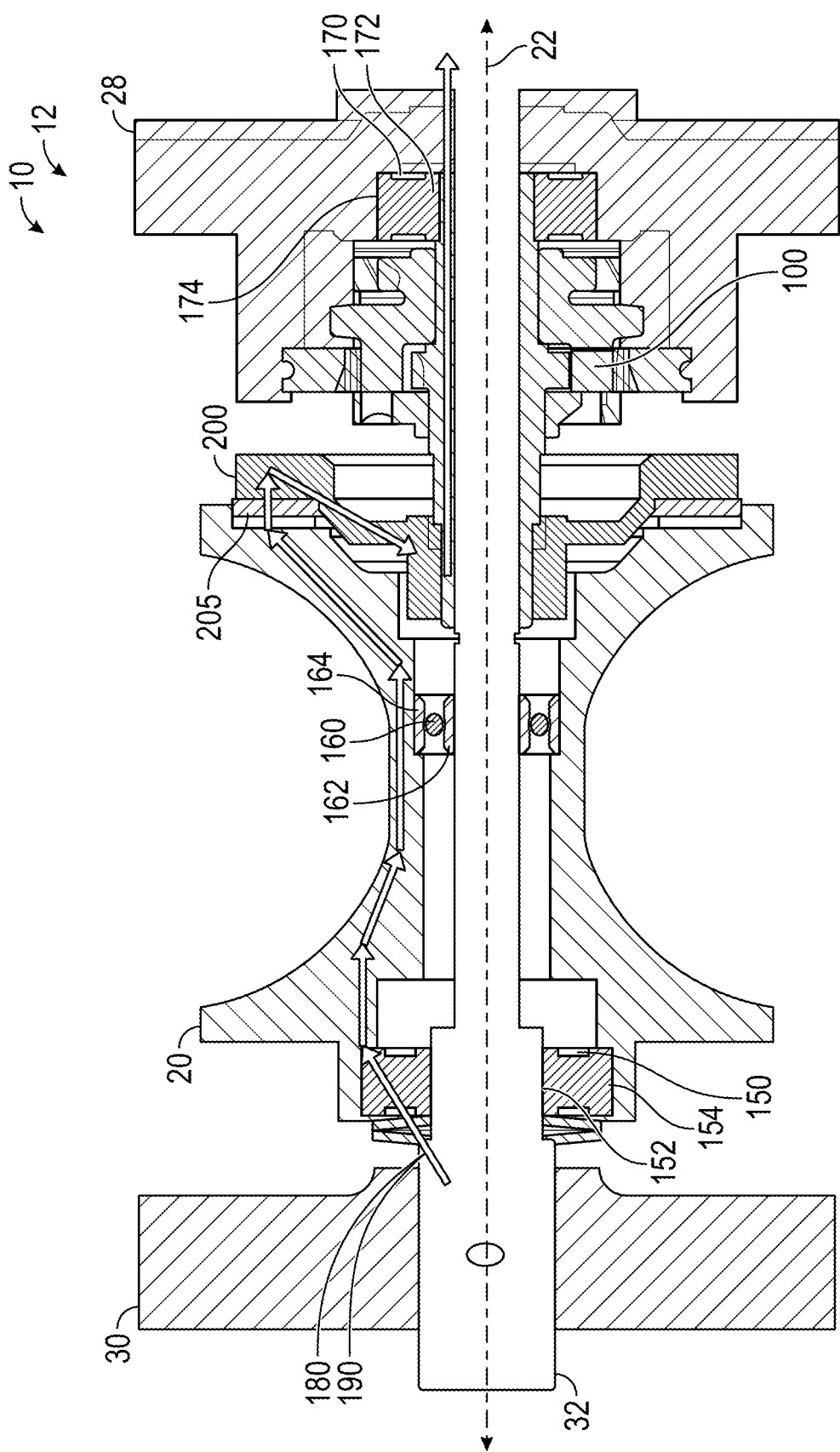
FIG. 4 is a detailed view of a prior art baitcaster, according to an exemplary embodiment.

Axial force distribution, as illustrated in FIG. 4, is commonly routed into the spool drive mechanism 100 due to the absence of a bearing housing (e.g., bearing housing 110 not shown in FIG. 4). Due to the absence of the bearing housing and first bearing, the axial force 180 may be directed through the braking mechanism 200 where the axial force 180 may be then directed parallel to the input shaft 32. As shown in FIG. 4, the axial force 180 is directed parallel to the input shaft 32 through the spool drive mechanism 100, thus creating excessive stress on the spool drive mechanism 100. The excessive stress on the spool drive mechanism 100 has commonly made the spool drive mechanism a common point of failure in the field.

Referring now to FIG. 3, the axial force 180 may be directed away (e.g., around, etc.) from the spool drive mechanism 100. The axial force 180 may be routed from the bearing housing 110 to the first member 28, at a location where the bearing housing 110 abuts the first member 28. According to an exemplary embodiment, the axial force 180 may be directed through at least the bearing housing 110, where the axial force 180 is distal the spool drive mechanism 100. The bearings 140, 150, 160, 170 may be further configured to transfer the axial force 180 between the rotating components (e.g., input shaft 32, spool 20, spool drive mechanism 100, etc.).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A baitcaster for retrieving a fishing line, the baitcaster comprising:
    a housing defining a first member and a second member;
    a spool positioned between the first member and the second member, the spool configured to rotate in a first direction and a second direction;
    a drivetrain positioned proximate the first member and configured to rotate the spool in the first direction and the second direction;
    a bearing housing positioned between the spool and the drivetrain; and
    an input shaft disposed along at least a midpoint of the baitcaster, the input shaft configured to coaxially align the spool, drivetrain, and bearing housing;
    wherein an axial force is generated from rotation of the input shaft via the drivetrain, the axial force extending along a length of the input shaft, and wherein the axial force is distributed through at least a portion of the bearing housing to prohibit the axial force from transferring into the drivetrain.

2. The baitcaster of claim 1, further comprising a plurality of bearings coaxially aligned with the input shaft, wherein one of the plurality of bearings is disposed within the bearing housing, and wherein each of the plurality of bearings comprises an inner portion and an outer portion.

3. The baitcaster of claim 2, wherein the axial force is directed through at least one of the plurality of bearings, and wherein the axial force is directed into the inner portion and out of the outer portion.

4. The baitcaster of claim 1, further comprising a braking mechanism positioned between the bearing housing and a friction plate, the braking mechanism comprising a friction disc configured to abut the spool when the braking mechanism is engaged.

5. The baitcaster of claim 4, wherein a friction force is generated between the spool and the friction disc, and wherein the axial force is linearly proportional to the friction force.

6. The baitcaster of claim 5, wherein the spool rotates in the second direction when the axial force is greater than the friction force.

7. The baitcaster of claim 1, wherein the bearing housing further comprises a first portion and a second portion, wherein the bearing housing abuts the first member at a location proximate the second portion, and wherein the second portion is positioned distal the input shaft.

8. The baitcaster of claim 7, wherein the axial force is directed from a position proximate the second member to a position proximate the first member, and wherein the axial force is directed parallel to the input shaft.

9. The baitcaster of claim 8, wherein the axial force is directed around the drivetrain by directing the axial force through the bearing housing and into the first member.

10. A baitcaster for retrieving a fishing line, the baitcaster comprising:
a housing defining a first member and a second member;
a spool drive mechanism coupled to the first member, the spool drive mechanism configured to rotate a spool in a first direction and a second direction;
a bearing housing positioned between the spool and the spool drive mechanism; and
a braking mechanism positioned between the spool and the bearing housing, the braking mechanism configured to prevent rotation of the spool by applying a force onto the spool via a friction disc;
wherein the force applied to the spool from the braking mechanism is a friction force, wherein an axial force is generated between the spool and the spool drive mechanism, wherein the axial force is directed from a position proximate the second member to a position proximate the first member, wherein the axial force is directed along at least a portion that is parallel to an input shaft, and wherein the axial force is linearly proportional to the friction force thereby reducing harshness on the baitcaster.

11. The baitcaster of claim 10, wherein the axial force is transferred along an axial force direction, and wherein the axial force direction has at least a portion that extends parallel to an axis, the axis extending through a midpoint of the baitcaster.

12. The baitcaster of claim 10, wherein the spool is positioned between the first member and the second member, the spool rotatably supported by the first member and the second member in a lateral direction.

13. A baitcaster for retrieving a fishing line, the baitcaster comprising:
a housing defining a first member and a second member;
a spool drive mechanism coupled to the first member, the spool drive mechanism configured to rotate a spool in a first direction and a second direction;
a bearing housing positioned between the spool and the spool drive mechanism;
a braking mechanism positioned between the spool and the bearing housing, the braking mechanism configured to prevent rotation of the spool by applying a friction force onto the spool via a friction disc;
a first bearing received within the bearing housing, the first bearing including a first inner portion and a first outer portion;
a second bearing positioned proximate the second member, the second bearing including a second inner portion and a second outer portion;
a third bearing positioned between the first bearing and the second bearing, the third bearing including a third inner portion and a third outer portion; and
a fourth bearing positioned proximate the first member, the fourth bearing including a fourth inner portion and a fourth outer portion;
wherein the first bearing, the second bearing, the third bearing, and the fourth bearing are coaxially aligned along an input shaft
wherein the input shaft is disposed along at least a portion of the housing;
wherein an axial force is generated between the spool and the spool drive mechanism;
wherein the axial force is linearly proportional to the friction force thereby reducing harshness on the baitcaster; and
wherein the axial force is generated from rotation of the input shaft via the spool drive mechanism, the axial force being distributed from a first end of the input shaft to a second end of the input shaft.

14. The baitcaster of claim 13, wherein the axial force is directed into at least one of the first bearing and the second bearing, and wherein the axial force is first directed into the first inner portion and the second inner portion, and then directed out of the first outer portion and the second outer portion.

15. A fishing rod assembly comprising:
a rod; and
a baitcaster fixedly coupled to the rod, the baitcaster comprising:
a housing;
a spool drive mechanism configured to rotate a spool in a first direction and a second direction;
a braking mechanism positioned proximate the spool, the braking mechanism configured generate a friction force to prevent rotation of the spool where the friction force is a force applied onto the spool through a friction disc;
an input shaft disposed through at least a portion of the length of the baitcaster, the braking mechanism, a bearing housing, the spool drive mechanism, and the spool coaxially aligned along the input shaft; and
a plurality of bearings configured to facilitate rotation of the input shaft, the plurality of bearings coaxially aligned along the input shaft and having a respective inner portions and outer portions;
wherein an axial force generated from rotation of the input shaft via the spool drive mechanism is distributed through at least one of the plurality of bearings to prohibit the axial force from transferring into the spool drive mechanism.

16. The fishing rod assembly of claim 15, wherein the axial force is directed into at least one of the plurality of bearings, and wherein the axial force is directed into the inner portions and directed out of the outer portions.

17. The fishing rod assembly of claim 15, wherein the axial force is directed around the spool drive mechanism by the axial force being transferred from the braking mechanism to a first member of the housing to prohibit the spool drive mechanism from receiving the axial force.

* * * * *